United States Patent
Baker et al.

(10) Patent No.: US 9,008,008 B2
(45) Date of Patent: Apr. 14, 2015

(54) METHOD FOR COMMUNICATING IN A MIMO CONTEXT

(75) Inventors: Matthew P. J. Baker, Canterbury (GB); Timothy J. Moulsley, Caterham (GB); Filippo Tosato, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 959 days.

(21) Appl. No.: 12/597,013

(22) PCT Filed: Apr. 28, 2008

(86) PCT No.: PCT/IB2008/051630
§ 371 (c)(1),
(2), (4) Date: Oct. 22, 2009

(87) PCT Pub. No.: WO2008/132688
PCT Pub. Date: Nov. 6, 2008

(65) Prior Publication Data
US 2010/0118782 A1      May 13, 2010

(30) Foreign Application Priority Data
Apr. 30, 2007 (EP) .................... 07301010

(51) Int. Cl.
H04W 4/00 (2009.01)
H04L 27/00 (2006.01)
(Continued)

(52) U.S. Cl.
CPC ........... *H04B 7/0417* (2013.01); *H04B 7/0634* (2013.01); *H04B 7/0639* (2013.01); *H04B 7/0632* (2013.01)

(58) Field of Classification Search
CPC .................................... H04B 7/0634
USPC ....................................... 370/328
See application file for complete search history.

(56) References Cited

U.S. PATENT DOCUMENTS

| 7,542,441 | B2* | 6/2009 | Choi et al. | .................... 370/328 |
| 7,751,353 | B2* | 7/2010 | Shapira et al. | ................ 370/310 |

(Continued)

FOREIGN PATENT DOCUMENTS

| EP | 1508992 A2 | 2/2005 |
| EP | 1608081 A2 | 12/2005 |
| EP | 1775857 A1 | 4/2007 |

OTHER PUBLICATIONS

Hojin Kim et al, "On the Performance of Limited Feedback Single-/Multi-User MIMO in 3GPP LTE Systems", Wireless Communication Systems, Sep. 1, 2006, p. 684-688.

(Continued)

*Primary Examiner* — Gerald Smarth

(57) ABSTRACT

The present invention relates to a method for communicating from a primary station with an array of transmit antennas to a secondary station on a downlink channel, said method comprising steps of, at the primary station, (a) configuring the downlink channel, step (a) being subdivided into steps of: (a2) computing a precoding to be applied during a corresponding transmission from the primary station to the secondary station for each of an array of transmit antennas; (a3) applying a reversible transform to the precoding, thus ascertaining a set of precoding coefficients substantially representative of the precoding in a transform domain; (a4) computing a set of parameters comprising at least one parameter, said parameter being substantially representative of the coefficients obtained at step (a3); (a5) signaling the set of parameters to the secondary station; (b) transmitting data to the secondary station substantially according to the precoding computed at step (a2).

14 Claims, 1 Drawing Sheet

(51) Int. Cl.
*H04B 7/06* (2006.01)
*H04B 7/04* (2006.01)

(56) References Cited

U.S. PATENT DOCUMENTS

| | | | | |
|---|---|---|---|---|
| 2004/0082303 | A1* | 4/2004 | Giannakis et al. | 455/130 |
| 2006/0029157 | A1* | 2/2006 | Dabak et al. | 375/299 |
| 2006/0094373 | A1 | 5/2006 | Hottinen | |
| 2006/0140294 | A1* | 6/2006 | Hottinen et al. | 375/260 |
| 2006/0146945 | A1* | 7/2006 | Chow et al. | 375/260 |
| 2007/0153731 | A1* | 7/2007 | Fine | 370/329 |
| 2007/0223423 | A1* | 9/2007 | Kim et al. | 370/334 |
| 2008/0080632 | A1* | 4/2008 | Kim et al. | 375/267 |
| 2008/0080634 | A1* | 4/2008 | Kotecha et al. | 375/267 |

OTHER PUBLICATIONS

Bishwarup Mondal et al, "Algorithms for Quantized Precoding in MIMO OFDM Beamforming Systems", Wireless Networking and Communications, Feb. 28, 2005, p. 1-8.

Mehdi Ansari et al, "Unified MIMO Pre-Coding Based on Givens Rotation", IEEE 802.16 Broadband Wireless Access Working Group Publications, Apr. 11, 2004, p. 1-11.

* cited by examiner

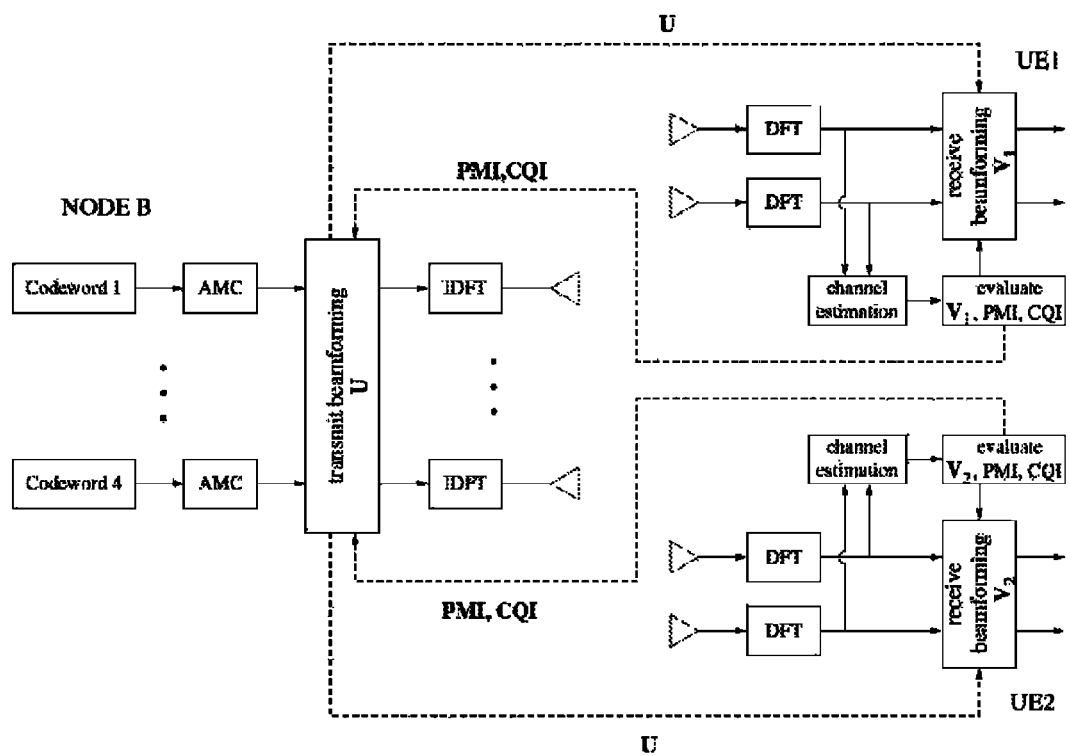

METHOD FOR COMMUNICATING IN A MIMO CONTEXT

FIELD OF THE INVENTION

The present invention relates to a method for communicating within a network

BACKGROUND OF THE INVENTION

Multiple-input multiple-output (MIMO) is a technology for next generation wireless systems to enhance the capacity and robustness of the communication link. MIMO technology is based on the presence of multiple transmit antennas and multiple receive antennas in the communication link. Application of MIMO technology is envisioned for cellular communication, broadband wireless access, as well as for wireless local area networks (WLANs). A plurality of two or more transmit antennas is also referred to as an array of transmit antennas herein.

The benefits of MIMO communication are obtained through a combination of antenna arrays that provide spatial diversity from the propagation channel and algorithms that can adapt to the changing multivariate channel.

In future mobile systems and in the long-term evolution of the Universal Mobile Telecommunication System (UMTS LTE) the use of multiple-antenna techniques will become increasingly important to meet spectral efficiency requirements. A significant gain in spectral efficiency can be achieved in a downlink transmission by multiplexing multiple codewords in the spatial domain to either a single user or multiple users sharing the same time-frequency resource block. These single-user or multi-user MIMO schemes exploiting the multiplexing gain of multi-antenna transmission are sometimes referred to as spatial division multiplexing (SDM) and spatial division multiple access (SDMA) techniques. An SDMA scheme enables multiple users within the same radio cell to be accommodated on the same frequency or time slot. The realization of this technique can be accomplished by using an antenna array, which is capable of modifying its time, frequency, and spatial response by means of the amplitude and phase weighting and an internal feedback control.

Beamforming is a method used to create a radiation pattern of the antenna array by constructively adding the phases of the signals in the direction of the communication targets (terminal devices) desired, and nulling the pattern of the communication targets that are undesired or interfering.

In this context, the beamforming vector plays an important role. For purposes of illustration of the meaning of the beamforming vector, in an exemplary single-user communication system employing transmit beamforming and receive combining, assuming that signalling is done using M transmit and N receive antennas, the input-output relationship of this communication system is given by $$y = z^H H w x + z^H n$$

where H is a N×M channel matrix connecting the transmitter and the receiver, z is the receive combining vector, $z^H$ is its Hermitian transpose, w is the transmit beamforming vector, x is the transmitted symbol from a chosen constellation, and n is independent noise added at the receiver.

The aim is to design the signal x such that it can effectively convey information to the users.

One of the challenges in the design of the beamforming vectors for SDM and SDMA techniques is the need for the base station to know the channels for all the users and receiving antennas of each user. This would require a large amount of feedback to be signalled from the users to the base station.

Solutions have been proposed to reduce this signalling information by introducing a codebook of few possible beamforming matrices. Each user then applies a greedy procedure to select one or more preferred beamforming vectors out of the codebook, by evaluating the Signal-to-Noise-Ratios (SINRs) of different beamforming combinations. Thus, each user has to signal one or several indexes of the preferred vector or vectors, respectively, plus one or more Channel-Quality-Indicator (CQI) values, indicating the corresponding SINRs.

An issue with codebook-based solutions is that the beamforming vectors are not jointly optimized according to the channel conditions. The base station uses the feedback information from the users only to schedule transmission to the set of users reporting the best CQI values.

Alternatively, significant gain in the cell throughput can be achieved if the base station could implement an ad-hoc design of the beamformer. This is possible, for example, if the users report all the channel coefficients, after some quantization operation. However, this requires signalling as many complex values as the product, MN, between the number M of transmit antennas and the number N of receive antennas per user.

Similarly, a solution to this problem based on channel quantization and zero forcing beamforming is described in "Transform-Domain Feedback Signalling for MIMO Communication" in the applicant patent application having reference PH006732EP4.

Another approach is PU2RC (per-user unitary rate control) In FIG. 1 a block diagram is drawn of the fundamental operations carried out at the transmitter (Node B) and receivers (UE's) in a typical multi-user downlink MIMO scheme for which the present invention applies. The method described here is used to reduce the number of bits required to signal the precoding matrix U from the Node B to each UE selected for transmission.

FIG. 1 is a block diagram of the downlink multi-user MIMO operations carried out at the transmitter and receivers. The AMC block performs adaptation of modulation and coding for each spatial stream to be transmitted. The feedback from each UE consists of a PMI (precoding matrix indicator) index selected from a codebook of vectors and a real-valued CQI (channel quality indicator), which is an estimate of the SINR for the relevant received spatial stream.

The feedback from the Node B conveys quantised information on the vectors forming the precoding matrix U. This feedback from the Node B is the subject of the present invention.

Many solutions are known for pre-coding (also designated as beam forming) for Multi-user MIMO systems where pre-coding vectors are computed for streams transmitted to each of several users. However, it is desirable to be able to indicate to the receiver the beamforming coefficients which are used at the transmitter. In principle, for best performance, each user should know both its own coefficients as well as those for users.

There is a need to efficiently signal the precoding coefficients to each of the users scheduled for transmission so that they can derive a suitable phase reference for their wanted signal (e.g. from common reference signals), and also preferably to be able to optimise receiver coefficients possibly taking into account interference from signals intended for other users.

SUMMARY OF THE INVENTION

It is an object of the invention to propose an efficient method for signalling the vectors of precoding without creating too much overhead on the signaling channel. To this end, according to the invention, it is proposed a method for communicating from a primary station with an array of transmit antennas to a secondary station on a downlink channel, said method comprising steps of, at the primary station,
(a) configuring the downlink channel,
  step (a) being subdivided into steps of:
  (a2) computing a precoding to be applied during a corresponding transmission from the primary station to the secondary station for each of an array of transmit antennas;
  (a3) applying a reversible transform to the precoding, thus ascertaining a set of precoding coefficients indicative of the precoding in a transform domain;
  (a4) computing a set of parameters comprising at least one parameter, said parameter being substantially representative of the coefficients obtained at step (a3);
  (a5) signaling the set of parameters to the secondary station;
(b) transmitting data to the secondary station substantially according to the precoding computed at step (a2).

According to one aspect of the invention, a primary station comprises an array of transmit antennas for communicating with a secondary station on a downlink channel, wherein the primary station comprises configuration means for configuring the downlink channel, said configuration means further comprising computing, means for computing a precoding to be applied during a corresponding transmission from the primary station to the secondary station for each of an array of transmit antennas, transform means for applying a reversible transform to the precoding, thus ascertaining a set of precoding coefficients substantially representative of the precoding in a transform domain and means for computing a set of parameters comprising at least one parameter, said parameter being substantially representative of the coefficients obtained by the transform means, and means for signaling the set of parameters to the secondary station; and transmission means for transmitting data to the secondary station according to the precoding computed by the computing means.

The invention is based on the realisation that any well designed set of beamformers is likely to have low cross correlation (or even approach orthogonality). This means that the primary requirement is to be able to signal the coefficients for the beamformer used for the wanted signal.

As a consequence, the method of the invention allows an efficient signaling of the beamforming process on the transmitter side, based on communicating a set of precoding coefficients indicative of precoding in a transform domain from the transmitter to the receiver.

Moreover, as another aspect of the invention that can be combined with the first aspect of the invention, one can consider the downlink signalling itself.

In order to build the optimum receiver, it is necessary to know the precoding vectors used by the base station for all simultaneously-scheduled users. This enables a receiver with multiple receive antennas to derive the phase reference for its own data as well as to compute combining coefficients for rejection of interference from the signals for other users.

However, this results in a very large downlink signalling overhead.

According to this aspect of the invention, it is recognised that the most important purpose of the above downlink signalling (e.g. in terms of improving performance or total throughput) is providing sufficient information for the receiver to derive the precoding vector used for its own data. Further improved performance may be gained by interference rejection using some knowledge of the precoding vectors for other users, but this is not the primary goal that the said downlink signalling must accomplish.

Therefore according to the signalling aspect of the invention, the amount of information provided pertaining to the precoding vector of the user's own data is greater than the amount of information provided pertaining to other simultaneously-used precoding vectors.

The former said amount of information may for example be greater in terms of having a finer resolution, more frequent update rate, finer frequency-domain granularity, etc.

The present invention also relates to a base station adapted to implement the method of the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram representing the fundamental operations carried out at the transmitter (Node B) and receivers (UE's) in a typical multi-user downlink MIMO scheme for which the present invention applies.

DETAILED DESCRIPTION OF THE INVENTION

The present invention relates to a method of communicating from a primary station to a secondary station. Such a primary station can be a base station or a Node B. Such a secondary station can be a mobile station or a user equipment.

1) In one embodiment the invention is applied in a cellular system using TDMA. The radio channel is assumed to be non-dispersive (i.e. subject to flat fading). Each mobile terminal has a single receive antenna. Each base station has a plurality of transmit antennas, (as an example let assume 4 transmit antennas). Orthogonal pilot signals are transmitted from each antenna. Frequency re-use is applied so that each cell uses a different frequency from its neighbours. Each mobile terminal (or user) is allocated to a cell served by a particular base station. The following procedure is applied:

The network receives measurements from the mobile terminals on the transfer function of the downlink channel from each of the transmit antennas of the base station serving its cell. Indeed, the base station receives from each secondary station channel state information, that can be signaled on a signaling channel. This information can be an estimate of a preferred direction for transmission, or as processed in the patent application with the applicant's reference PH006732EP4.

The network can make a selection of the mobile terminals served by each cell, based for example on transfer functions, and availability and priority of data to be transmitted. Indeed, the information included in the channel state information obtained in the previous step can be used. This selection can depend on several criterion. For instance, it is possible to make this selection based on the channel state information received from the secondary stations. Moreover, alone or in combination with the preceding criterion, the selection can be made depending on the priority of the data to be transmitted. Another example is to select a first station based on a criterion like discussed above, and then selecting secondary station whose channel properties are not highly correlated with the firstly selected secondary station. Still another possibility is to select the secondary stations to obtain the maximal throughput.

Pre-coding coefficients are then computed for each scheduled user, for example using zero forcing beamforming. The coefficients are not mandatorily corresponding to the preferred directions and other information signalled by the secondary station previously. In fact, these coefficients can be different from the signalled coefficients, and are based on the computation of the primary station, but this computation can be carried out at least partly with help of the respective channel state information received previously at the base station.

A reversible transform, for instance linear and orthogonal, like an IDFT (Inverse Discrete Fourier Transform), is carried out for translating the precoding into coefficients in a transform domain, like the angular domain for the example of IDFT. Thus, a set of precoding coefficients indicative of the precoding in the transform domain is obtained. These coefficients can be quantized for problems of reducing data to be transmitted.

An index can be deduced for instance by comparing the values of the coefficients with look up tables. It is for instance possible to compare the maximum value of the set of coefficients to select a table, whose index would then be transmitted to the selected secondary stations in the following step.

Information identifying the users expected to receive data, the transmission format and any other information needed to receive the data is sent. This would include an index representing or indicating the pre-coding coefficients applied for each user, as seen above.

Data is then transmitted to each of the selected users using the pre-coding coefficients and some of the available transmit antennas. Data for different users may be sent at the same time.

With 4 transmit antennas, simultaneous transmissions to up to 4 users is possible.

The step of computing the precoding may be carried out with target to obtain the highest possible data rate.

2) In another embodiment otherwise like (1), the cellular system uses OFDM, and the radio channel is assumed to be dispersive, but can be considered as flat within each sub-carrier. Let us assume 32 sub-carriers. Other differences with the first embodiment are as follows The mobile terminal makes measurements of the downlink transfer function for each sub-carrier and each transmit antenna.

The final user selection includes an allocation of sub-carriers for each user.

The allocation of sub-carriers is preferably signalled to the mobile terminals.

In principle, with 4 transmit antennas and 32 sub-carriers transmissions could be made to 128 users simultaneously. However, in a practical system this number would probably be lower.

3) In another embodiment otherwise like (1) the invention is applied in a cellular system using CDMA (such as UMTS). The radio channel is assumed to be non-dispersive. The base stations are distinguished by different scrambling codes. Orthogonal pilot sequences are transmitted from each antenna. Other differences with the first embodiment are as follows:

Different channelization codes may be used to provide orthogonal communication channels, but the channel transfer function does not depend on the channelization code.

The final selection user selection may include allocation of channelization codes to users. However, this would need to be done on the basis of scheduling principles rather than be determined by the radio channel transfer function Data for different users may use the same channelizaton code.

With 4 transmit antennas, simultaneous transmissions to up to 4×number_of_channelization_codes is possible.

4) In another embodiment otherwise like (1), each mobile terminal has two antennas. In this case up to two data streams may be transmitted to a user. In this case the transmitter may signal two pre-coding indices, to the user, representing the each of the transmitted beams.

5) In another embodiment, otherwise like (1) the system uses TDD. Under the assumption of channel reciprocity, the channel transfer functions in one direction can be determined by observing signals transmitted in the other direction.

In general, for dispersive channels, the pre-coding used at the transmitter may vary as a function of frequency (e.g. with different vectors applied to different parts of the spectrum). In such a case, it may be desirable for the transmitter to be able to signal more than one different pre-coding vectors.

A different vector/scalar quantisation technique, other than the IDFT-based quantisation could be used.

In one embodiment of the signalling aspect of the invention, transmissions take place to multiple users simultaneously using different precodings, and the time-frequency resource blocks assigned for transmissions to the different users may be grouped differently. In such a case, the provision of complete precoding information to each user in respect of the precoding used for every other user whose time-frequency resources wholly or partially overlap with the user's own resources would result in a very high signalling overhead. By transmitting a reduced amount of information about the other users' precoding, it can be designed to be valid for more than one other user.

Fields of Application

Radio communication systems, especially mobile and WLAN systems. In particular cellular systems such as UMTS and UMTS LTE.

The invention claimed is:

1. A method for communicating from a primary station with an array of transmit antennas to a secondary station on a downlink channel, said method comprising steps of, at the primary station, (a) configuring the downlink channel, step (a) being subdivided into steps of:

(a2) computing a precoding for said array of transmit antennas to generate a set of pre-coding coefficients to be applied during a corresponding transmission from the primary station to the secondary station with said array of transmit antennas;

(a3) applying a reversible transform to the set of precoding coefficients to ascertain a set of precoding coefficients in the angular domain, independent of data transmitted to the secondary station during said corresponding transmission from the primary station to the secondary station (a4) computing a set of parameters comprising at least one parameter said parameter being representative of the set of precoding coefficients in the angular domain obtained at step (a3);

(a5) signaling the set of parameters to the secondary station;

(b) transmitting data to the secondary station according to the precoding computed at step (a2).

2. The method of claim 1, further comprising prior to step (a), receiving at the primary station channel state information from the secondary station.

3. The method of claim 2, wherein step (a2) of computing said set of precoding coefficients is carried out at least partly with help of the respective channel state information.

4. The method of claim 1, wherein step (a2) of computing set of precoding coefficients is carried out to maximize the data rate.

5. The method of claim 1, further comprising, prior to step (a), selecting the secondary station from a plurality of secondary stations.

6. The method of claim 5, wherein selecting the secondary station from a plurality of secondary stations is carried out at least partly with the help of an indication of the corresponding channel quality for each secondary station.

7. The method of claim 5, wherein selecting the secondary station from a plurality of secondary stations is carried out at least partly with the help of an indication of the priority of the respective data to be transmitted to each corresponding secondary station.

8. The method of claim 5, wherein selecting the secondary station from a plurality of secondary stations is carried out by selecting a first secondary station, and by selecting further secondary stations having channel properties being not highly correlated with the channel properties associated with the first secondary station.

9. The method of claim 1, wherein selecting the secondary station from a plurality of secondary stations is carried out so that the total data throughput is maximized.

10. The method of claim 1, wherein the reversible transform is linear and orthogonal.

11. The method of claim 10, wherein step (a3) comprises applying an Inverse Discrete Fourier Transform to said set of precoding coefficients.

12. The method of claim 1, wherein the set of parameters of step (a4) is based on the coefficient from the set of precoding coefficients in the angular domain computed at step (a3) having a maximum magnitude.

13. A primary station comprising an array of transmit antennas for communicating with a secondary station on a downlink channel, further comprising:

configuration means for configuring the downlink channel, said configuration means further comprising:

computing means for computing a precoding for said array of transmit antennas to generate a set of pre-coding coefficients to be applied during a corresponding transmission from the primary station to the secondary station for with said array of transmit antennas, transform means for applying a reversible transform to the set of precoding coefficients to ascertain a set of precoding coefficients in the angular domain independent of data to be transmitted to the secondary station during said corresponding transmission from the primary station to the secondary station and means for computing a set of parameters comprising at least one parameter, said parameter being representative of the set of precoding coefficients in the angular domain obtained by the transform means, and means for signaling the set of parameters to the secondary station; and transmission means for transmitting data to the secondary station according to the precoding computed by the computing means.

14. A secondary station comprising an array on reception antennas for communicating with a primary station on a downlink channel, the secondary station comprising:

means for determining channel state information;

means for transmitting to the primary station, the channel state information;

means for receiving a set of parameters from the primary station comprising at least one parameter, said at least one parameter being representative of a set of precoding coefficients in an angular domain obtained by applying a reversible transform to a precoding computed at the primary station, wherein said precoding is independent of data to be transmitted to the secondary station by the primary station, the computing of the precoding coefficients being carried out at the primary station at least partly with help of the respective channel state information; and means for deriving a phase reference depending on said set of parameters; and means for receiving data from the primary station according to the phase reference.

* * * * *